Jan. 26, 1932.  W. F. RICHARDS  1,842,841
HAND BRAKE
Filed June 13, 1928   3 Sheets-Sheet 1

Inventor
Willard F Richards
By
his Attorney

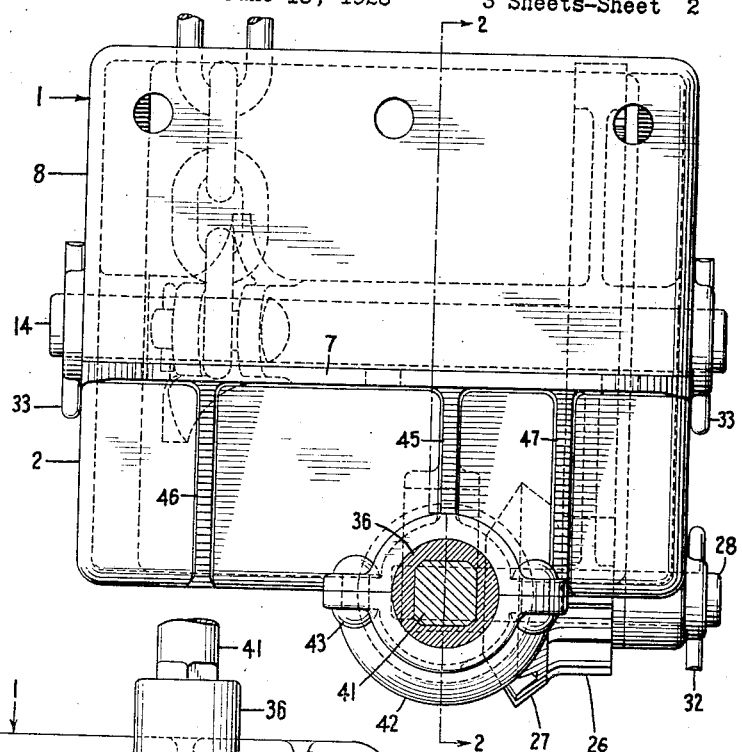

Jan. 26, 1932.　　　W. F. RICHARDS　　　1,842,841
HAND BRAKE
Filed June 13, 1928　　　3 Sheets-Sheet 3

Inventor
Willard F. Richards
By
his Attorney

Patented Jan. 26, 1932

1,842,841

UNITED STATES PATENT OFFICE

WILLARD F. RICHARDS, OF DEPEW, NEW YORK, ASSIGNOR TO THE SYMINGTON COMPANY, OF NEW YORK, N. Y., A CORPORATION OF MARYLAND

HAND BRAKE

Application filed June 13, 1928. Serial No. 285,058.

This invention relates to hand brakes and more particularly to a geared brake in which the brake chain is wound on a horizontal drum and in which the mechanical advantage or ratio of the brake can be readily varied to suit different conditions.

The principal object of my invention, generally considered, is to provide a geared hand brake having a quick initial take-up by means of an arm on a horizontal winding drum, said drum being actuated by spur gearing, whereby the braking power ratio may be readily varied by changing the gear ratio to suit different requirements of railroad equipment.

Another object of my invention is to provide brake mechanism involving a horizontal winding drum with a main gear preferably integral therewith, a driving pinion meshing therewith and a driven bevel gear preferably integral with said pinion, said bevel gear being driven from a driving bevel gear which is preferably formed with a non-circular pocket for receiving a brake staff for actuating the gear.

A further object of my invention is to provide brake mechanism involving a base casting formed with depending arms or brackets between the lower ends of which is mounted a pivot pin, said pin being preferably connected thereto by means of cotters and rotatably supporting a preferably integral winding drum and main gear member, said casting also supporting another pivot pin upon which is rotatably mounted a driving pinion and preferably integral driven bevel gear, said pinion meshing with the main gear for rotating the drum and the driven bevel gear being engaged by a driving bevel gear preferably formed with an extended hub portion providing a bearing and thrust collar, said hub portion being desirably formed with a squared or other non-circular pocket therein for receiving the lower end of a brake staff.

Other objects and advantages of the invention relating to the particular arrangement and construction of the various parts will become apparent as the description proceeds.

Referring to the drawings illustrating my invention, the scope whereof is defined by the appended claims:

Figure 3 is a plan of the mechanism of Figures 1 and 2, shown partly in section, on the line 3—3 of Figure 2, looking in the direction of the arrows.

Figure 4 is an end elevational view of the mechanism.

Figure 2:
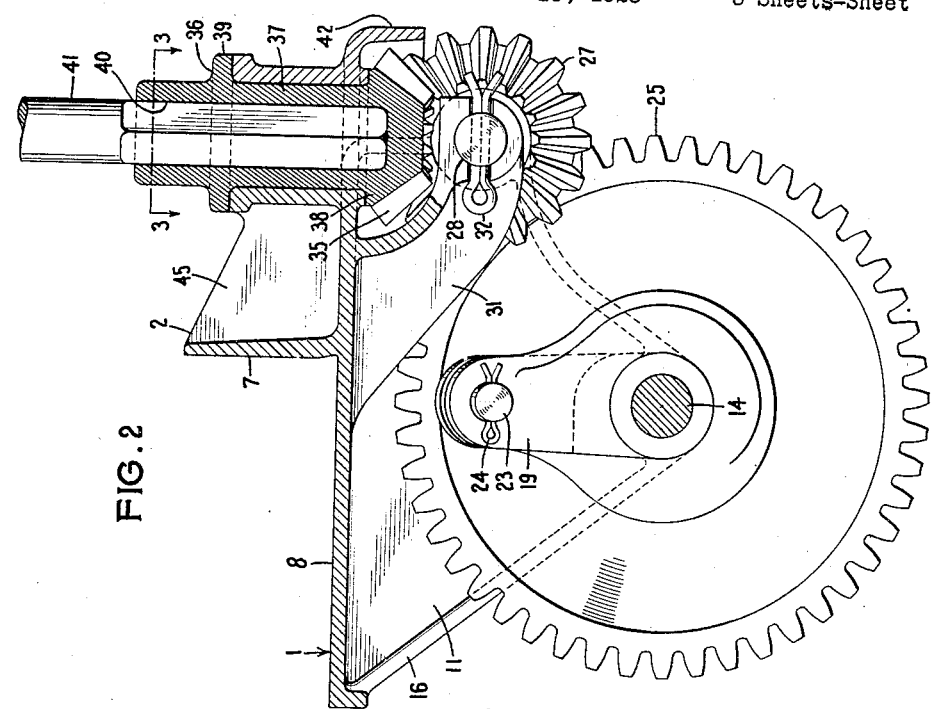
Figure 2 is a longitudinal sectional view of the mechanism illustrated in Figure 1 on the line 2—2 of Figure 3, looking in the direction of the arrows.
Figure 1:
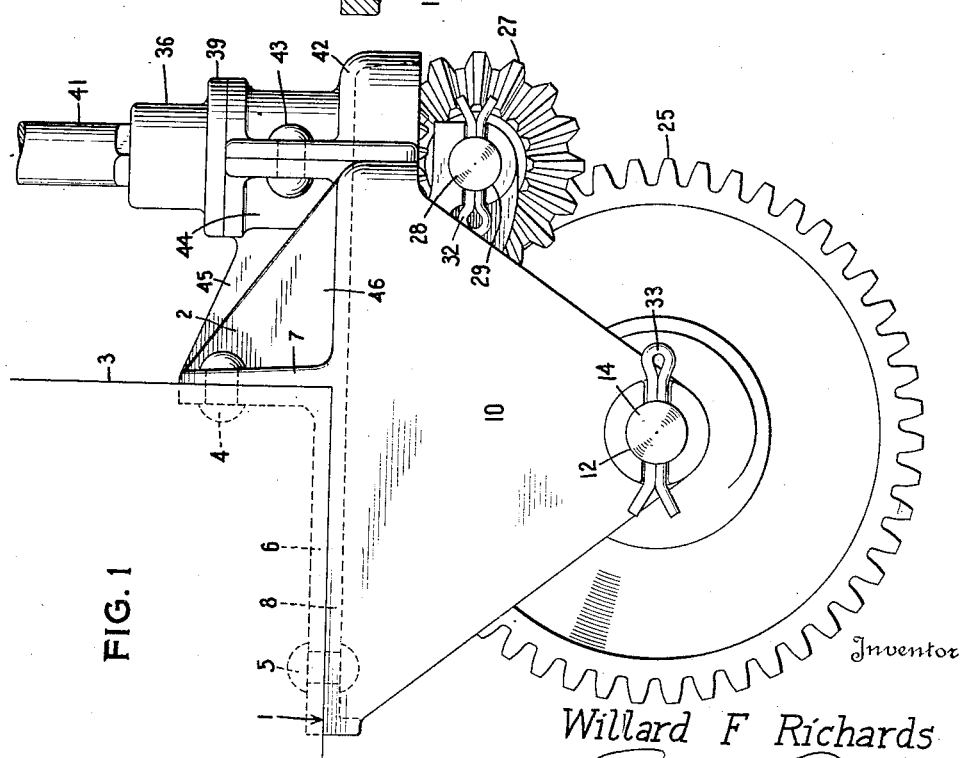
Figure 1 is a side elevation of one embodiment of my hand brake.

Referring to the drawings in detail, like parts being designated by like reference characters, and first considering the embodiment of my invention illustrated in Figures 1 to 4, inclusive, there is shown a hand brake mechanism 1 comprising a base or bracket casting 2 connected to the end of a railway vehicle 3 in any desired manner, as by means of rivets 4 and 5, extending through, respectively, the vertical and horizontal flange of the end sill 6 of the vehicle or car and the adjacent flange or web portions 7 and 8, respectively, of the base casting 2. Said base casting 2 has the edge of its main web or floor 8 rigidified by a depending peripheral flange 9, said flange at the sides of the casting being extended downwardly to form brackets or arms 10 and 11, respectively, the lower portions of which are apertured, as indicated at 12 and 13, respectively, for receiving a pivot pin 14. The arms 10 and 11 are preferably rigidified by inturned flanges 15 and 16. The flanges 15 on the arm or bracket portion 10 preferably flare adjacent their upper ends, as indicated at 17 and finally merge into the peripheral flange portion 9 on an easy curve, as illustrated.

The pivot pin 14 serves for rotatably mounting the brake chain winding drum 18 thereon, said drum preferably having formed integral therewith a quick take-up arm 19, which is bifurcated and between the separated portions 20 of which is connected a link 21 of the brake chain 22, as by means of a pin 23 extending through said link 21 and corresponding apertures in the ends of said arm 19, undesired removal of said pin being prevented in any desired manner, as by means of a cotter 24 extending through the end opposite the head thereof.

The main gear 25 is pivoted on the same pin 14 as the winding drum 18 and is desirably rigidly connected to said drum, as by forming said gear integral therewith, at the opposite end of said drum from the quick take-up arm 19. Said gear 25 is driven by means of a driving pinion 26 which is desirably rigidly connected to a driven bevel gear 27 as by being formed integral therewith. Said bevel gear and pinion are rotatably mounted on a supporting pin 28 which is held parallel with the pin 14, as by extending into another aperture 29 in the arm 11 of the base casting 2 and an aperture 30 in a curved or angularly disposed bracket or arm 31. Said pin 28 is desirably securely connected to both brackets or arms as by means of cotters 32 which extend through hub portions of the arms and intersect the ends of said pin. A similar connection is desirably provided for the pin 14, the cotters 33 intersecting hub portions 34 on the arms 10 and 11 and the ends of said pin 14 whereby not only is the pin prevented from turning but the arms or depending bracket portions are braced with respect to each other. This construction restricts the wear to the pivot pins and rotating gears and drum, thereby saving the base casting from wear.

The driven bevel gear 27 is engaged by a driving bevel gear 35, the axis of which is preferably vertically disposed and the hub 36 of which is desirably elongated to form a bearing 37 and thrust collars 38 and 39 on opposite sides of the corresponding bearing portions on the base casting 2. The hub portion is preferably formed with an upwardly opening pocket or cavity 40, desirably non-circular or approximately square in cross-section for receiving the correspondingly formed lower end of a brake staff 41. It will be understood that the brake staff 41 is provided, as usual, with operating means (not shown) such as a hand wheel and the usual ratchet wheel and retaining pawl.

In order to apply and remove the driving bevel gear 35 and its hub portion 36, the outer half 42 of the surrounding bearing portion of the base casting 2 is formed detachable and connected to the main casting in any desired manner, as by rivets 43. The inner or integral portion 44 of said base casting bearing portion is desirably braced with respect to the upstanding flange 7 of the casting by means of a tapering gusset 45. Said flange 7 is further desirably braced with respect to the main web or floor portion 8 of the casting by means of triangular gusset portions 46 and 47.

Referring now to the embodiment of my invention illustrated in Figures 5 to 10, inclusive, a construction is there disclosed which is identical with the previous embodiment, except that a split independent bearing 48 is provided for the hub of the driving bevel gear $35^a$, said bearing being formed with tapered sides 49 and being clamped in position by a cap casting $42^a$ riveted or otherwise suitably connected to the bracket or base casting $2^a$, as by means of rivets 50 and 51, extending through adjacent flange portions, respectively, disposed above and below the main web $8^a$ of the casting $2^a$. As in the previous embodiment, the hub portion $36^a$ of the driving bevel gear $35^a$ is formed with an upwardly opening non-circular or squared pocket $40^a$ receiving the correspondingly formed lower end of the brake staff $41^a$.

Figures 5, 6, 11:
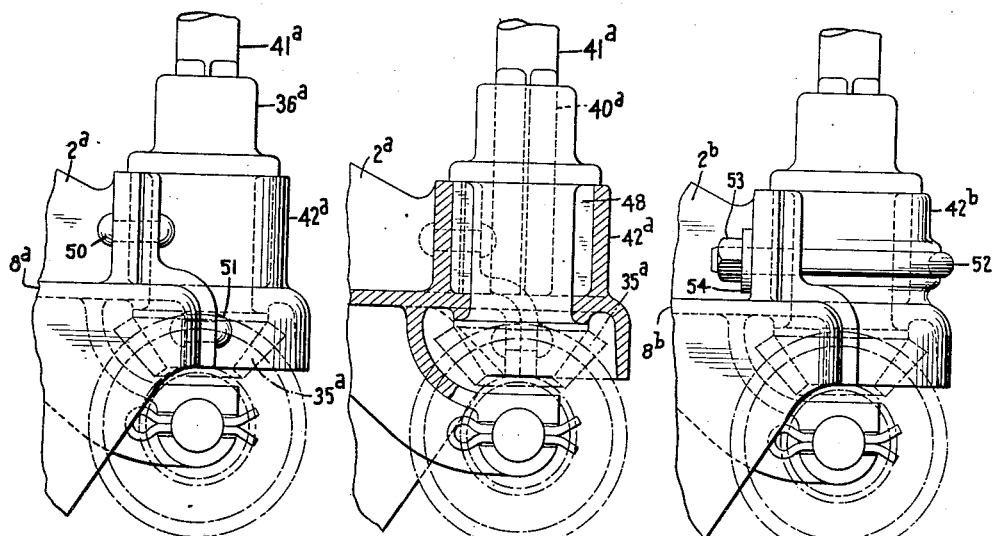
Figure 5 is a fragmentary side elevational view of a portion of the mechanism adjacent the lower end of the brake staff, said view corresponding to Figure 1 but showing a modification.
Figure 6 is a longitudinal fragmentary sectional view corresponding to Figure 2, but further illustrating the modification of Figure 5.
Figures 11, 12 and 13 are fragmentary views corresponding, respectively, to Figures 5, 7 and 8, showing another modification.
Figure 7:
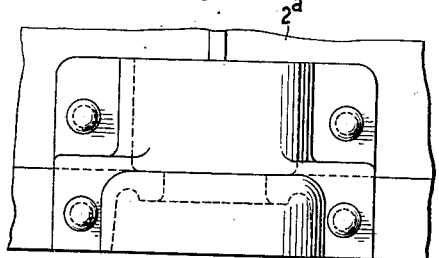
Figure 7 is a fragmentary end elevational view of the construction shown in Figures 5 and 6.
Figure 12:
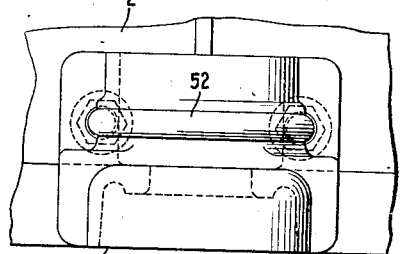
Figure 8:
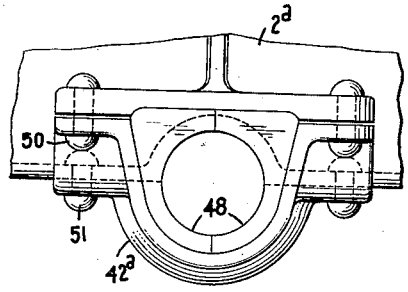
Figures 8 is a fragmentary plan view of the construction shown in Figure 7.
Figure 13:
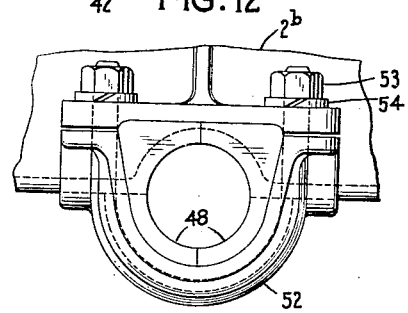
Figures 9, 10:
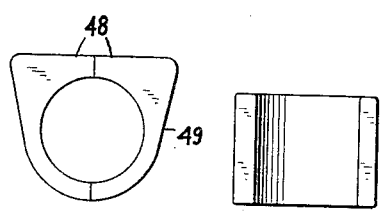
Figure 9 is a plan view of the bearing detached from the housing portions.
Figure 10 is a side elevational view of one of the bearing portions illustrated in Figure 9.

Referring now to the embodiment of my invention illustrated in Figures 11, 12 and 13, a construction is there disclosed which is identical with that of the embodiment illustrated in Figures 5 to 10, inclusive, except that the cap casting $42^b$ is retained in position, not by rivets but by a U-bolt 52, which embraces said casting and extends through the adjacent flange portions of said casting and the main or base casting $2^b$, preferably above the main web $8^b$ thereof and is held in position preferably by means of nuts 53 and washers 54. Except as specifically described the construction is preferably identical with that of the previous embodiment.

From the foregoing description of preferred embodiments of my hand brake, it will be seen that I have devised a mechanism which is relatively simple in construction, in which the parts may be cheaply manufactured, and which provides a brake which is flexible, efficient and readily installed. By means of the common hand wheel, ratchet, pawl and staff, the bevel driving gear at the bottom of the staff is actuated and through intermediate gearing effects turning of the drum to wind the chain therearound and apply the brakes.

It will be seen that upon the initial take-up of the chain, said chain is farthest from the main gear 25, whereas at the end of the winding up operation when the greatest force is applied to the chain, said chain is wound up on the portion of the drum between the arm 19 and the gear 25 and is nearer the point of application of the force for winding up said chain, that is, the main gear.

The winding ratio for the brake is readily varied to suit different requirements. For example, if a ratio of 5.2 to 1 is desired, the main gear 25 may be formed with a pitch diameter of 10½" and provided with 42 teeth, whereas the pinion is then preferably provided with a 2" pitch diameter and 8 teeth. If a ratio of 4 to 1 is required, the gear may have a 10" pitch diameter with 40 teeth and the pinion a 2½" pitch diameter with 10 teeth. If a 3.1 to 1 ratio is desired, the gear may be formed with a 9½" pitch diameter and 38 teeth and the pinion provided with 12 teeth and have a 3" pitch diameter. In this way the ratio or mechanical advantage of the brake may be altered to suit requirements without making any other change in the construction thereof.

Having thus described my invention, I claim:

1. Brake mechanism comprising a supporting-casting, a winding drum mounted for rotation thereon, a detachable supplemental casting, a main gear on said drum, a driving pinion meshing with said gear, a driven bevel gear connected to said pinion, and a driving bevel gear in mesh with said driven bevel gear and adapted for connection with a brake staff, said driving bevel gear having an extended hub portion mounted between said supporting casting and said supplemental casting.

2. Brake mechanism comprising a winding drum formed with a quick take-up arm adapted for connection with a brake chain, a main gear rigid with said drum at the opposite end from said arm, whereby the chain is farthest from the main gear upon initial take-up thereof and room is provided between the arm and gear so that the point of application of the force approaches the main gear as the chain is wound up and the force increased, a driving pinion meshing with said main gear, a driven bevel gear rigid with said pinion, and a driving bevel gear in mesh with said driven bevel gear and adapted for connection with a brake staff.

3. Brake mechanism comprising a casting with depending bracket arms, a pivot pin extending through and connected with said arms, a brake chain drum with quick take-up arm and integral main gear pivotally mounted on said pin, another pivot pin supported by said casting parallel with the winding drum pin, an integral pinion and driven bevel gear mounted on said other pin with the pinion in mesh with the main gear, and a driving bevel gear in mesh with said first-mentioned bevel gear and adapted for connection with a brake staff.

4. Brake mechanism comprising a base casting with depending pivot pin supporting brackets, a winding drum pivot pin extending through a pair of brackets and held immovable therein by cotter means, an integral winding drum and main gear mounted on said pin, another pivot pin extending through a pair of brackets on said casting and held immovable with respect thereto by cotter means, an integral pinion and driven bevel gear pivotally mounted on said other pivot pin with the pinion in mesh with the main gear, and a driving bevel gear in mesh with said driven bevel gear and adapted for connection with a brake staff.

5. Brake mechanism comprising a base casting form with depending apertured arms, a pivot pin extending through the apertures in said arms and connected thereto, an integral winding drum and gear member mounted on said pin, another pivot pin mounted on said casting, a driving pinion and bevel gear mounted on said other pin with the pinion meshing with said main gear, and a driving bevel gear, with a hub portion rotatably mounted in said casting, meshing with said first-mentioned bevel gear and adapted for connection with a brake staff.

6. Brake mechanism comprising a base casting with depending brackets, a pin extending therebetween and connected thereto, a winding drum mounted on said pin and formed with an integral quick take-up arm at one end thereof adapted for connection with a brake chain, a main gear integral with said drum at the opposite end from said arm, a second pin supported on said casting, a driving pinion mounted on said second pin and meshing with said gear, a driven bevel gear integral with said pinion, and a driving bevel gear in mesh with said driven bevel gear and adapted for connection with a brake staff.

7. Brake mechanism comprising a base casting with depending brackets, a normally horizontal pivot pin extending through said brackets, means preventing rotation of said pin with respect to said brackets, a winding drum with a main gear rigid therewith mounted on said pin, a second pivot pin also supported from said casting, means preventing rotation of said pin with respect to said casting, a rigidly connected pinion and driven bevel gear pivotally mounted on said second pivot pin with the pinion in mesh with the main gear, and a driving bevel gear in mesh with said driven bevel gear and formed for connection with a brake staff.

8. Brake mechanism comprising a casting formed with depending arms, a pivot pin non-rotatably supported by said arms, a winding drum formed with a rigidly connected gear pivotally mounted on said pin, a second pivot pin supported by said casting, a driving pinion and bevel gear pivotally mounted on said second pin with the pinion meshing with said main gear, and a driving bevel gear with a hub portion rotatably mounted with respect to said casting meshing with said first-mentioned bevel gear and formed for connection with a brake staff.

In testimony whereof I affix my signature.

WILLARD F. RICHARDS.